May 20, 1952  W. A. DERR  2,597,075
REMOTE CONTROL SYSTEM
Filed Feb. 10, 1951  5 Sheets-Sheet 1

INVENTOR
Willard A. Derr.
BY
ATTORNEY

May 20, 1952 W. A. DERR 2,597,075
REMOTE CONTROL SYSTEM
Filed Feb. 10, 1951 5 Sheets-Sheet 5

WITNESSES:
Robert C Baird
F. V. Giolma

INVENTOR
Willard A. Derr.
BY
G.M. Crawford
ATTORNEY

Patented May 20, 1952

2,597,075

UNITED STATES PATENT OFFICE 2,597,075

REMOTE-CONTROL SYSTEM

Willard A. Derr, Pittsburgh, Pa., assignor to Westinghouse Electric Corporation, East Pittsburgh, Pa., a corporation of Pennsylvania Application February 10, 1951, Serial No. 210,388

8 Claims. (Cl. 177—351)

My invention relates generally to remote control systems, and it has reference in particular to a remote metering system operating over a supervisory control system.

Generally stated, it is an object of my invention to provide in a supervisory control system for obtaining metering information from remote points in a simple and effective manner.

More specifically, it is an object of my invention to provide in a supervisory control system for obtaining remote metering information without having to disconnect the line relays from the signal channel.

Another object of my invention is to provide in a supervisory control system for selectively obtaining either continuous or selective metering indications between remotely disposed stations.

Yet another object of my invention is to provide in a supervisory control system for obtaining continuous metering information between remotely disposed stations when the supervisory control equipment is in a normal or reset condition and is available for supervisory control operations.

Other objects will in part be obvious, and will in part be explained hereinafter.

In practicing my invention in accordance with one of its embodiments, provision is made for selective and continuous metering indications to be transmitted through points of a supervisory control system between a remote substation and a dispatching office which are connected by a signal channnel. The supervisory control equipment at each the office and the substation includes a signalling circuit including a rectifier device which is connected in series circuit relation with the channel and signal transmitting means for energizing the channel with a given polarity for operating the line relays whereby coded signals are transmitted. At both the substation and the dispatching office, a line supervision circuit is normally connected in parallel circuit relation with the rectifier device of the signalling circuit and in series circuit relation with the signal channel and line relays so that the channel is normally energized with a polarity which is the reverse of that used for signalling. Metering-transmitting means and metering-receiving means are connected to the channel in parallel circuit relation with the rectifier device of the signalling circuit at the substation and office for energizing the channel, also in a sense which is the reverse of that used for signalling, for obtaining either selective or continuous metering indications between the substation and the office without the line relays having to be disconnected from the channel.

For a more complete understanding of the nature and scope of my invention, reference may be made to the following detailed description, which may be read in connection with the accompanying drawing in which:

Figs. 1 through 4 are disposed to be arranged with Fig. 2 above Fig. 1, Fig. 3 to the right of Fig. 1, and Fig. 4 above Fig. 3, in a similar manner to Figs. 1 through 4 of the Boswau Patent No. 2,091,301, which issued on August 31, 1937. Fig. 5 is disposed to be arranged alongside and to the right of Fig. 3.

Figure 1:
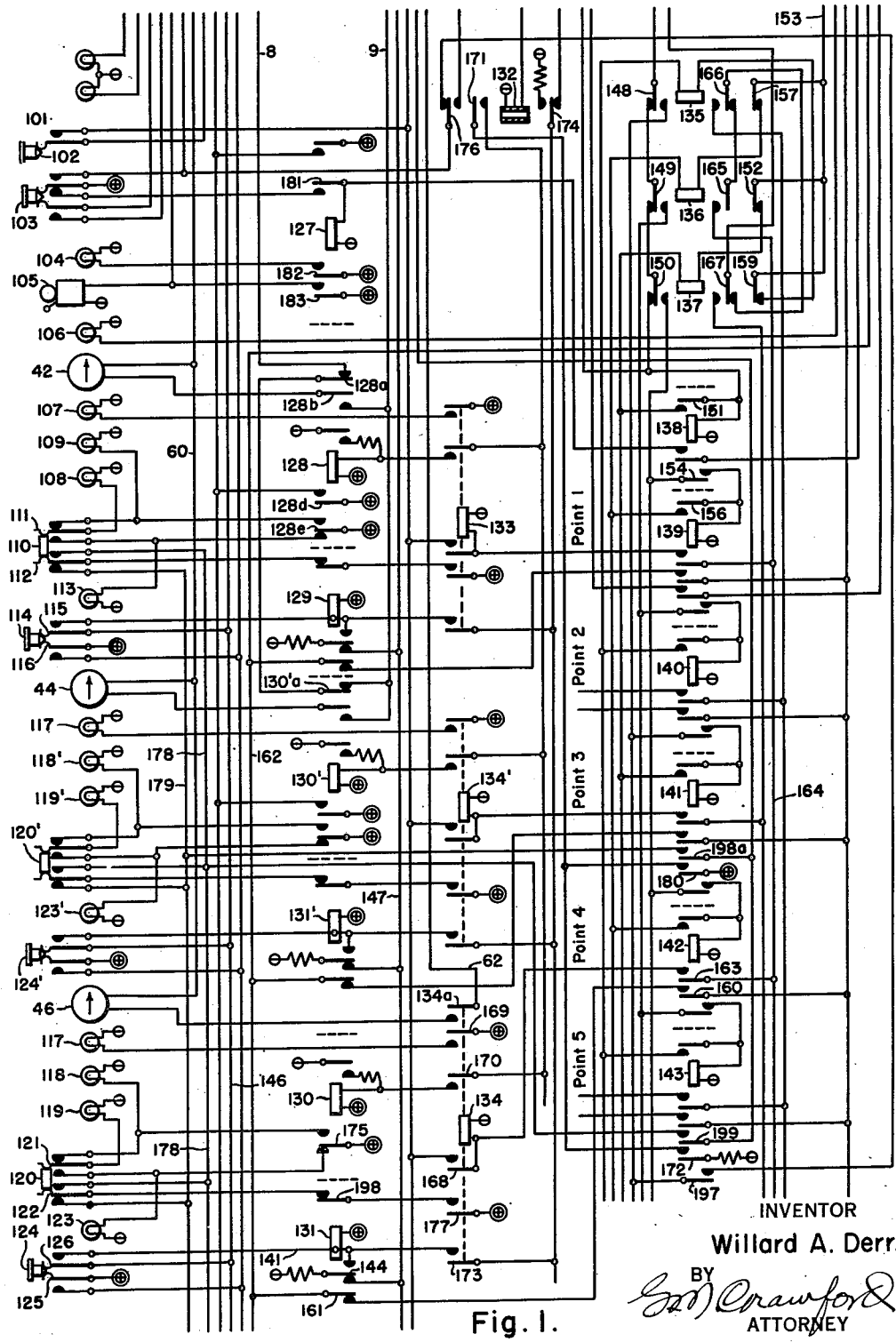
Fig. 1 is a diagrammatic view of the metering equipment and the individual point and counting equipment at a dispatching office in a supervisory control system embodying the invention in one of its forms.

When Figs. 1 through 4 are thus arranged, they represent a supervisory control system which is basically the same as the system which is shown and described in detail in the Boswau patent. For the purpose of simplification, some of the circuit conductors have been rearranged from the positions shown in the Boswau patent, but the general arrangement of the supervisory control equipment, and the manner of operation thereof remains substantially identical with that which is described in the Boswau patent. Most of the elements of the system of the Boswau patent are shown in the drawings of the present application in the same cooperative relation as in the Boswau patent, and they bear the same reference characters as used in said patent. Certain relays of the Boswau patent have been modified in order to provide additional circuit functions, and other relays have been added in order to perform functions different from those performed by the apparatus of the Boswau patent. Entirely new elements have been designated by reference characters not found in the Boswau patent, whereas other elements which have been changed to any appreciable extent from their showing in the Boswau patent have been designated by means of prime numbers corresponding to the numbers used in the Boswau patent, in order to more readily identify them.

Figure 3:
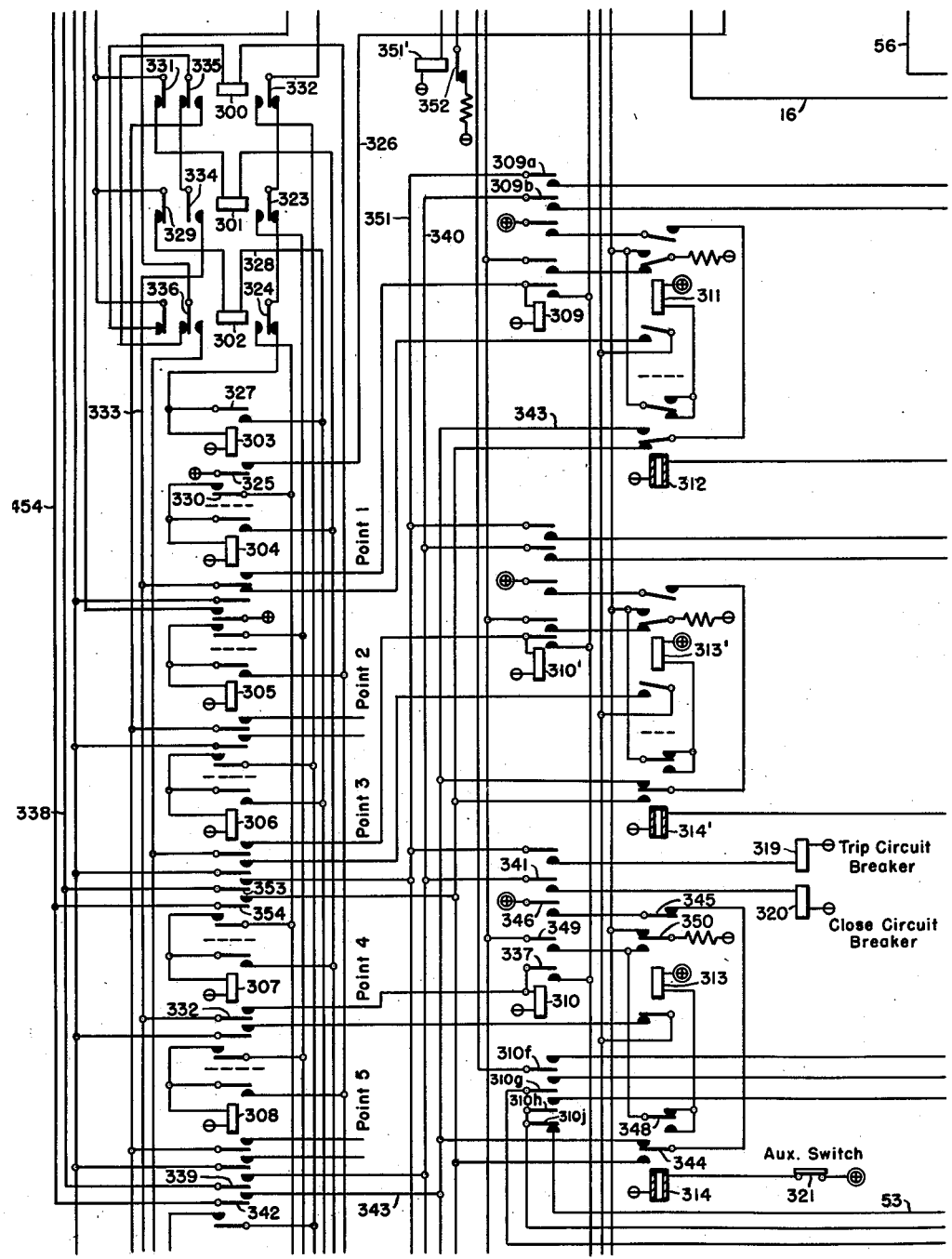
Fig. 3 is a diagrammatic view of the individual point and counting equipment at a remote substation associated with the dispatching office of Figs. 1 and 2 in a supervisory control system embodying the invention.

Referring to Figs. 1 and 3 of the drawings, it will be seen that the necessary relays have been added to complete point 3 at the dispatching office and substation. These relays are similar to those of point 4, and are accordingly designated by prime numbers corresponding to those of relays of point 4.

Figure 2:
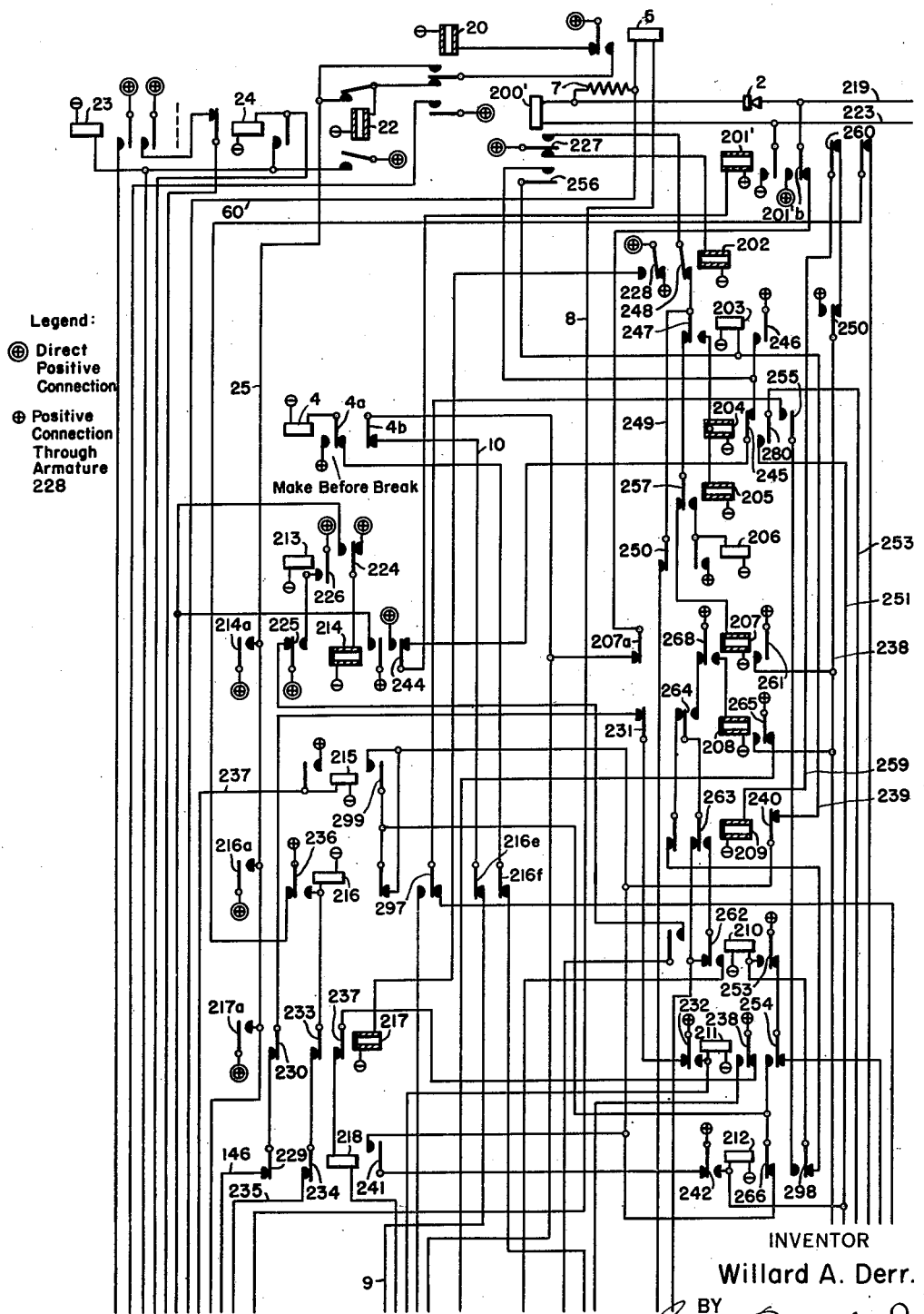
Fig. 2 is a diagrammatic view of the common equipment at the dispatching office.
Figure 4:
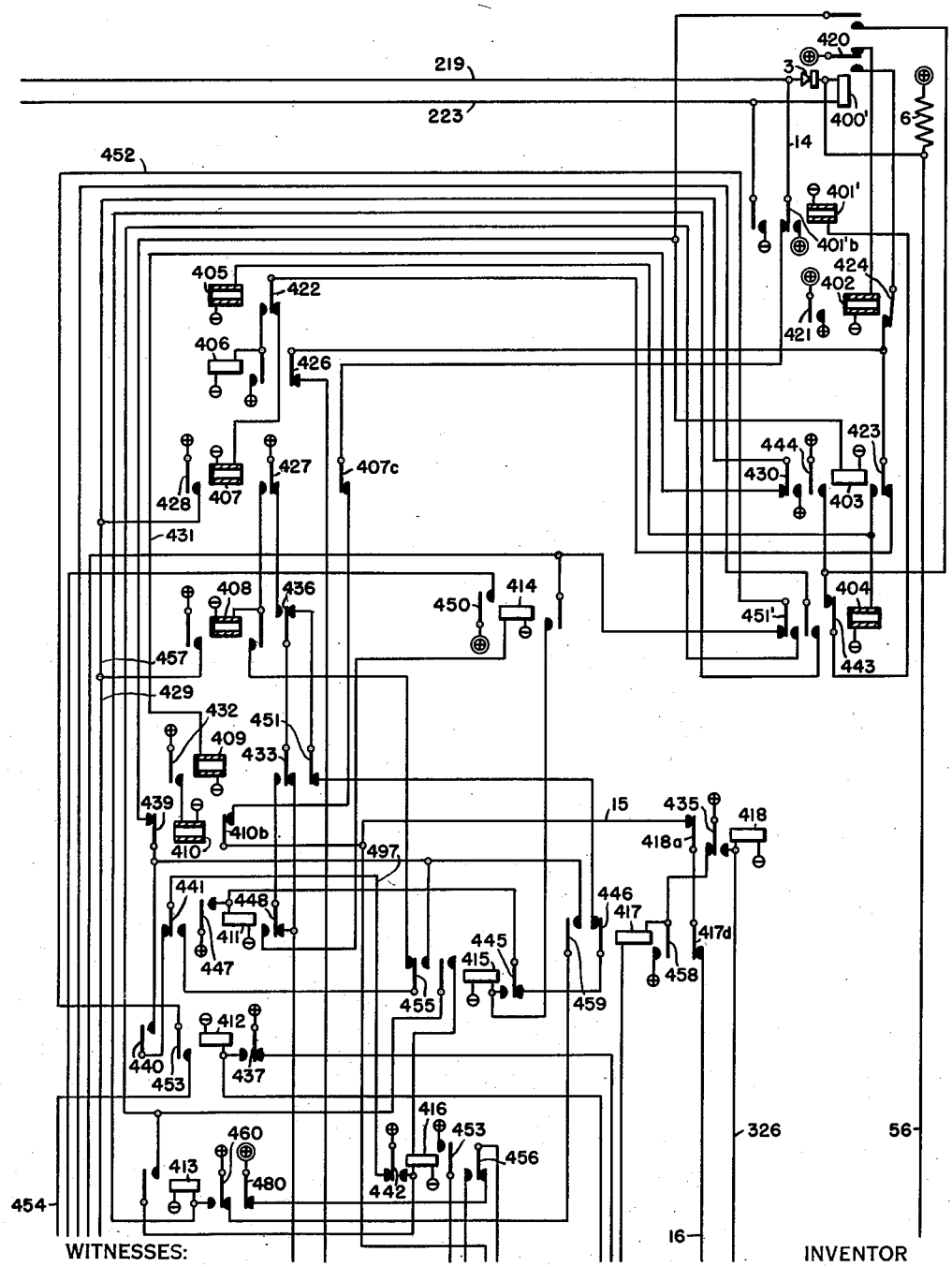
Fig. 4 is a diagrammatic view of the common equipment of the supervisory control system at the remote substation.

Referring to Figs. 2 and 4 of the drawings in particular, it will be seen that the line relays 200' and 400' of the present application have been reconnected so as to provide a normally deenergized parallel circuit arrangement of the signal channel instead of the normally energized series circuit arrangement shown in the Boswau patent. The line relays 200' and 400' of the present application are normally deenergized relays and are energized upon operation of the impulse relays 201' and 401', which connect the conductors 219 and 223 of the signal channel to the positive and negative terminals of the dispatching office and substation batteries respectively. Control of the impulse relays 201' and 401' may be effected through the supervisory control equipments in exactly the same manner as described in detail in the Boswau patent for the impulse relays 201 and 401 respectively.

In order to provide for maintaining the line relays 200' and 400' connected to the signal channel while effecting supervision of the signal channel, line supervision means may be connected across or, in effect, in parallel circuit relation with impedance means in the signalling circuit at each the dispatching office and the substation, such as a resistor, or the rectifier devices 2 and 3. To prevent interference with supervisory or control signalling functions, normally closed circuit means such as armatures and back contacts of the impulse relays 201' and 401', receiving start and sending start control relays 4 and 418, sending start relays 216 and 417, and receiving drive relays 207 and 407 may be connected in circuit relation with the line supervision means to remove it from the signal channel during operation of the supervisory control equipment. The receiving start relay 4 may be connected to be energized on receipt of the first impulse from the substation, being energized with the first counting relay 138, through armature 216 of the sending start relay 216. A holding circuit to indirect positive is provided for relay 4 through armature 4a, and make before breaker contacts.

In order to maintain supervision of the signal channel, provision may therefore be made for normally applying to the signal channel at the remote substation, a line supervision potential having a polarity opposite to that normally used during signalling operations for energizing a line supervision relay 5 at the dispatching office. For example, as shown in Fig. 4, a resistor 6 having a relatively high ohmic value may be used to connect the positive terminal of the substation battery to the upper terminal of the line relay 400'. The rectifier device 3 may be used to block the flow of current to the dispatching office, thus forcing the line supervision current to pass through the operating winding of the line relay 400' and thence to the dispatching office through conductor 223, the operating winding of the line relay 200', resistor 7, the operating winding of the line supervision relay 5, conductor 8, back contact and armature 128a of the lamp relay 128, armature 130'a and back contact of the lamp relay 130', conductor 9, back contact and armature 216e of the transmitting start relay 216, conductor 10, back contact and armature 4b of the receiving start relay 4, back contact and armature 207a of the receiving drive relay 207, and back contact and armature 201'b to conductor 219. The return path to the substation battery negative may be traced through conductor 14, armature 401'b and back contact, armature 407c and back contact of the substation receiving drive relay, back contact and armature 410b of the office preference relay, conductor 15, back contact and armature 418a of the substation start control relay, armature 417d and back contact of the substation start relay, conductor 16, armature 316'c and back contact, and armature 319'c to negative.

The conductors 219 and 223 will thus be normally energized, the resistors 6 and 7 being of such values that the line supervision relay 5 which requires less than 2 mils of current will be normally energized, while the line relays 200' and 400' which normally require more than 5 mils of current to operate them, will remain in the deenergized position. An auxiliary line supervision relay 20 may be provided in conjunction with the relay 5 so as to be normally maintained in a deenergized condition so long as the line supervision relay 5 is energized. A control relay 22 of the delayed dropout type may be controlled by the line supervision and auxiliary relays so as to be normally maintained in an energized position, for effecting operation of an alarm relay 23 to energize an alarm 105, when deenergized for a sufficient length of time. Provision may be made for maintaining the control relay 22 energized during supervisory control operations so as to prevent false indications of line faults during signalling operations, by providing a holding circuit for the control relay through conductor 25, and armature 214a of the reset relay 214, armature 216a of the transmitting start relay, and armature 217a. A reset relay 24 is provided to release the alarm.

Figure 5:
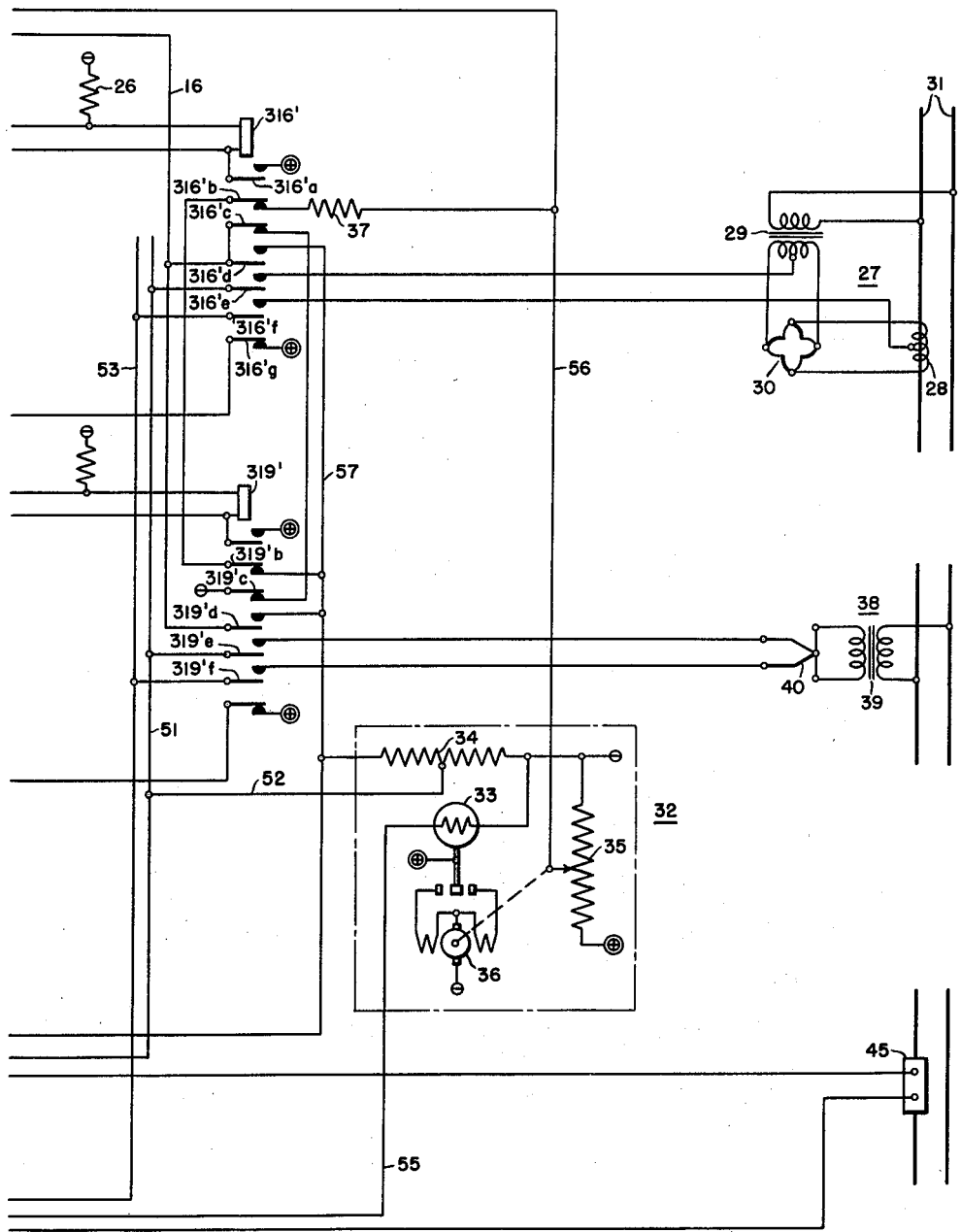
Fig. 5 is a diagrammatic view of the metering transmitting equipment at the remote substation.

In order to provide for transmitting continuous metering information from the remote substation to the dispatching office while the supervisory equipment is reset, the circuit breaker control relays 316 and 317 associated with point 1 in Fig. 3 of the Boswau patent have been replaced by a single metering relay 316' which is disposed to effect connection to the signal channel of metering means 27, which may, for example, comprise a current transformer 28 and a potential transformer 29 connected to a thermal converter circuit 30 for producing a direct current output voltage proportional to the power in the alternating current conductors 31. The metering relay 316' may be disposed to be energized through armature 309b of the point relay 309 to negative through resistor 26 upon the transmittal of the usual circuit breaker "close" code in response to operation of the control key 110, and deenergized in response to transmission of the "trip" code. The metering relay 316' may connect metering means 27 to the signal channel across the rectifier device 3, through a metering transmitter 32 of the current balance type, which may, for example, as shown in Fig. 5, comprise a relatively sensitive galvanometer device 33 disposed to be connected in bridging relation with a voltage divider 34 and a motor operated potentiometer 35, for controlling the operation of a motor 36 connected in driving relation with the potentiometer 35, to provide for applying to the signal channel a potential which is at all times balanced against the input potential from the metering means 27. Armature 316'd may be used for connecting the transmitter 32 to the signal channel. An impedance 37 may be normally connected across the output terminals of the transmitter through normally closed armatures 316'b and 319'b and back contacts, having an impedance approximating that of the signal channel, so as to preset the transmitter for a metering operation.

Point 3 of the supervisory control apparatus at the remote substation may be used in a similar manner to provide for obtaining a continuous metering indication from metering means 38, which may be connected to the signal channel either through a separate transmitter or through the transmitter 32, by means of a metering relay 319' which replaces the usual "trip" and "close" relays of Boswau, under the control of a point relay 310' which corresponds to relay 310 of point 4 of the supervisory control equipment. The metering means 38, which may comprise a potential transformer 39 connected to a thermal converter 40, may be connected through armatures 319'e and 319'f to the metering transmitter 32 in a manner similar to that of the metering means 27. Armature 319'd connects the transmitter 32 to the signal channel.

Referring to Figs. 1 and 2 of the drawings, it may be seen that a metering receiver 42 may be connected across the rectifier device 2, in parallel circuit relation with the line supervision relay 5, being connected through armature 128b and the front contact of the lamp relay 128 associated with point 1 of the supervisory control equipment to the signal channel for receiving metering indications from the metering means 27 when said means is connected to the channel through selection of point 1 and operation of the metering control relay 316'. Armature 128a and back contact disconnect the line supervision relay 5 during a metering operation, and armature 128d and front contact provide a holding circuit for the line supervision control relay 22 during metering, so as to prevent energization of the alarm. In order to provide for normally disconnecting the metering means at the dispatching office from the signal channel when a supervisory or control function is being performed, the metering receiver 42 may be connected to the signal channel through armature 216e and back contact of the transmitting start relay 216, back contact and armature 4b of the receiving start relay 4, back contact and armature 207a of the receiving drive relay 207, and back contact and armature 201'b of the impulse relay 201'. A metering receiver 44 may be similarly connected by relay 130' of point 3.

The metering transmitter 32 at the dispatching office is likewise connected to the signal channel in parallel circuit relation with the line supervision circuit through armatures and back contacts of the impulse relay 401', the substation receiving drive relay 407, the office preference relay 410, the substation start control relay 418 and the substation start relay 417, so as to provide for disconnecting it from the signal channel during supervisory control functions.

To effect a continuous metering indication at the dispatching office from the metering means 27 at point 1 of the remote substation, the point selection key 114 may be depressed to effect the sending of the selection code of two pulses for selecting point 1 at the remote substation. Immediately upon operation of the selection key 114, the dispatching office transmitting start relay 216 is energized through the lower contacts of the selection key as described in detail in connection with the description of point 4 of the Boswau patent. When relay 216 is energized, positive battery is applied to the holding circuit for the line supervision control relay 22, through armature 216a, so as to maintain the line supervision control relay energized even though the line supervision relay 5 may be momentarily deenergized during signalling operations. Energization of the transmitting start relay 216 disconnects the line supervision relay 5 from the signal channel by opening armature 216e. The supervisory control equipment functions in the usual manner to effect energization of the conductors 219 and 223, and hence the line relays 200' and 400'.

Upon the operation of line relay 400', the substation receiving drive relay 407 is energized as is the start control relay 418, and they effect disconnection of the battery potential (for line supervision purposes) from the signal channel during impulsing. After transmission of the selection code, point relay 309 will be energized and a check code transmitted to the dispatching office in the usual manner. Upon receipt of the check code, point relay 133 will be energized.

The operate key 110 may now be operated to transmit the "close" code which effects closing of the remote circuit breaker in the Boswau patent for effecting energization of the metering relay 316' by applying direct positive to it through armature 309b. Operation of the metering relay 316' provides a holding circuit through armature 316'a and connects the metering means 27 to the current balance transmitter 32 through armatures 316'e and 316'f, conductors 51 and 52, and conductor 53, back contact and armature 310j and conductor 55 for applying to the signal channel, through conductor 56, and conductor 57, front contact and armature 316'd, conductor 16 and the circuit traced for line supervision to conductor 219, a metering potential.

Operation of the metering relay 316 results in deenergization of the position indicating relay 312 which is disconnected from battery positive through armature 316'g. This results in transmission of a supervisory code which effects operation of the lamp relay 128 at the dispatching office, so as to energize the red lamp 109 through front contact and armature 128e, to prepare for connecting the metering receiver 42 to the signal channel through common conductor 60 and armature 128b and conductor 9, over the circuit through armatures 216e, 4b, 207a and 201'b. The energizing circuit for the line supervision relay 5 is interrupted at armature 128a, so as to effectively disconnect the line supervision relay from the signal channel to prevent interference of the metering operation. Armature 128e provides an obvious holding circuit for the supervision control relay 22 to prevent operation of the alarm.

The start relay 216 and the receiving relay 418 are deenergized during the reset pulse, but the metering circuits at both stations are held open by relays 201' and 407. After transmission of the reset pulse, the impulse relay 201' at the dispatching office and relay 407 at the remote substation are returned to the deenergized position and complete the metering circuit through armatures 201'b and 407c, so that remote metering indications may be received continuously after the supervisory control equipment has reset and is available for performing subsequent supervisory and control operations.

The metering means 27 and transmitter 32 may be readily disconnected from the signal channel by selection of the metering point in the usual manner, and operation of the operating key 110 to transmit the "trip" code for shunting down and releasing the metering relay 316' which disconnects the transmitter 32 and results in reconnection of the supervision potential to the channel and reconnection of the impedance 37 to the transmitter 32. The lamp relay 128 at the dispatching office changes position in response to transmission of the usual supervisory code by relay 312 being energized, and disconnects the receiver 42 at armature 128b, and restores the connection of the line supervision relay 5.

Should it be desired to obtain a selective metering indication, for example, through point 4 of the supervisory control equipment, while a continuous metering operation is taking place on point 1, the point selection key 124 may be operated to transmit the usual point selection code which will result in the point relay 310 of point 4 at the substation being energized. The metering means 45 at the remote substation will thereupon be connected to the signal channel through the metering transmitter 32, being, for example, connected to the transmitter through armatures 310g and 310h, the transmitter being connected to the signal channel through armatures 310f and conductor 56. The metering means 27 will be disconnected from the transmitter 32 at armature 310j of the point relay 310. Upon the transmission of the usual check code by the supervisory equipment at the remote substation, the point selection relay 134 at the dispatching office will be energized, and the metering receiver 46 associated point 4 will be connected to the signal channel through armature 134a, conductor 62, and armatures 207a and 201'b. Upon release of the impulse relay 201' and the receiving drive relays 407, the metering means 45 at the remote substation and 46 at the dispatching office will be connected to the signal channel through armatures and back contacts of these relays for obtaining metering information.

At the dispatching office, since the supervisory control equipment does not reset during a selective operation, the transmitting start relay 216 will remain in the energized position. Hence, the parallel circuit connections of the continuous telemetering receiving 42 and the line supervision relay 5 are interrupted at armature 216e, so as to prevent interference with the selective metering operation. At the remote substation, the substation start control relay 418 remains energized during the selective metering operation, and hence the continuous telemetering transmitter connections will be interrupted at armature 418a, and the connection of the line supervision potential to the signal channel will also be interrupted at this point.

The selective metering operation may be terminated by operating the release key 103 to reset the supervisory control equipment in the usual manner, or it may be terminated by actuating the operate key 120, after selection of the point, for energizing either the "trip" or "close" control relay 319 or 320 for tripping or closing a circuit breaker connected with that point at the remote substation in the usual manner. Upon operation of the circuit breaker, the usual supervision code is transmitted upon deenergization of supervisory relay 314 by the auxiliary breaker switch to effect a change in the lamp indications at the dispatching office. Subsequent to the transmission of the supervisory code, the usual reset pulse is transmitted, and the supervisory equipment is restored to its normal reset position. The metering transmitter means at the remote substation, and the metering receiver at the dispatching office are thereupon disconnected from the channel by relays 134 and 310 becoming deenergized and the metering means 27 and transmitter 32, and the metering receiver 42 are reconnected thereto through deenergization of relays 216, 201', 418 and 407 and 410.

From the above description and the accompanying drawings, it will be apparent that I have provided in a simple and effective manner for obtaining not only selective but also continuous metering indications over the signal channel of a supervisory control system with a minimum of interference with the supervisory and control functions. By utilizing parallel circuit connections of the line supervision equipment and the metering equipment with the impedance means in the signalling circuit at both the dispatching office and the substation, it is possible to transfer from one function to the other without having to disconnect the line relays from the signal channel. Accordingly, the supervisory control equipment may at all times be ready to perform a supervisory function regardless or not of whether a metering operation may be taking place, or whether the signal channel is merely connected for line supervision.

Since certain changes may be made in the above-described construction and the different embodiments of the invention may be made without departing from the spirit and scope thereof, it is intended that all the matter contained in the above-description and shown in the accompanying drawings shall be considered as illustrative and not in a limiting sense.

I claim as my invention:

1. In a supervisory control system having two stations connected by a signal channel, each of which stations has a plurality of control points and normally reset equipment operable to transmit and receive coded signals for selectively controlling said points, a signalling circuit at each station including an impedance device connected in series relation with said channel, metering means associated with certain ones of said points at said stations for supplying metering information concerning a point at one station to the associated point at the other station, and relay means at each station selectively operable to connect the metering means in parallel circuit relation with the impedance means of the signalling circuit at said station, said relay means being operable upon operation of said equipment to effect selection of said point and being so connected as to remain operated even when the supervisory control equipment is restored to its normally reset condition.

2. In a supervisory control system having two stations connected by a signal channel, each of said stations having a plurality of associated control points and normally reset equipment operable to transmit and receive coded signals for selecting and effecting control operations at said points, a signalling circuit at each station including a rectifier device connected in series relation with said channel, metering means associated with certain ones of said points at said stations for supplying metering information concerning a point at one station to the associated point at the other station, relay means at each station selectively operable only after selections of a particular point to connect the metering means in parallel circuit relation with the rectifier device of the signalling circuit at said station, and circuit means connected to provide an energizing circuit for said relay means at each station when the supervisory control equipment is returned to its normal reset condition.

3. In a supervisory control system having a plurality of stations connected by a signal channel, each of said stations having a plurality of control points and equipment operable to transmit and receive coded signals for selecting and effecting control operations at said points, means operable to reset the equipment to a normal rest condition, a signalling circuit at each station including a rectifier device connected in series relation with said channel, metering means at associated points at different ones of said stations for supplying metering information concerning a point at one station to the associated point at the other station, line supervision means normally connected in parallel circuit relation with the rectifier device at each station for determining a condition of the signalling channel, relay means at each of the associated points selectively operable upon selection of said points to connect the metering means in parallel relation with the rectifier device at said stations and interrupt the connections of the line supervision means, and circuit means providing holding circuits for said relay means to maintain them operated when the supervisory equipment is reset to a normal rest condition.

4. In a supervisory control system having at least two stations interconnected by a signal channel, each of said stations having a plurality of control points and normally reset equipment operable to transmit and receive coded signals for selecting and controlling said points, a signalling circuit at each station having a rectifier device connected in series relation with said channel, metering means associated with associated ones of said points at said stations for supplying metering information concerning a point at one station to the associated point at the other station, relay means at associated ones of said points operable to connect the metering means to apply a metering voltage across the rectifier devices at said points and maintain said connections when the supervisory equipment is returned to its normal reset condition, and additional relay means at different ones of said associated points operable to connect the metering means at said different ones of said associated points to apply different metering voltages across said rectifier devices, and operable to remove from said channel the first-mentioned metering voltage from the aforesaid associated ones of said points.

5. In a supervisory control system having at least two stations interconnected by a signal channel, each of said stations having at least one control point and equipment thereat for transmitting and receiving coded signals for selecting and controlling said points, a signalling circuit at each station including a rectifier device connected in series circuit relation with said signal channel, control means associated with said points for effecting operation of electrical apparatus at the point at one station from a corresponding point at the other station, metering means at said points for supplying metering information from the point at said one station to the point at said other station, relay means responsive to selection of the point at said one station from the point at the other station to connect the metering means in substantially parallel circuit relation with the signalling circuit rectifier device at said stations, and additional relay means at each station operable to effect selective operation of said apparatus at the point at said one station from the point at said other station and effect disconnection of the metering means from the channel after said relay means operates.

6. In a supervisory control system having two stations interconnected by a signal channel, each of said stations having a plurality of control points and normally reset supervisory control equipment operable to transmit and receive coded signals for selecting and controlling said points, a signalling circuit at each station including impedance means connected in series relation with said channel, metering means at each station, line supervision means at each station, impulse sending means at each station normally connecting the line supervision means to the channel in parallel relation with the impedance means of said signalling circuits, said impulse sending means being operable to connect the channel to a source of signal voltage and disconnect the line supervision means therefrom, and relay means operable in response to selection of a point at one station from a point at the other through operation of the impulse sending means to connect the metering means to the signal channel and disconnect the line supervision means therefrom, said relay means being disposed to maintain the connection of said metering means after the equipment is returned to said normal reset condition.

7. In a supervisory control system having two stations connected by a signal channel, each of said stations having a plurality of control points and supervisory control equipment normally in a reset position, said equipment being operable to transmit and receive coded signals for selecting and controlling said points, a signalling circuit at each station connected in series circuit relation with said channel, a line supervision circuit connected in parallel circuit relation with a portion of each signalling circuit and in series circuit relation with the signal channel, impulsing means normally connecting the line supervision circuit to the signal channel operable to effect energization of the signal channel to transmit coded impulses for selecting and operating a point metering means operable to supply metering information concerning a point at one station to an associated point at the other station, and relay means operable in response to operation of the impulsing means after the selection of a point to connect the metering means in series circuit with the signalling channel and disconnect the line supervision circuit therefrom.

8. In a supervisory control system having two stations connected by a signal channel, each of which stations has a plurality of control points and normally reset equipment operable to transmit and receive coded signals for selectively controlling said points, a signalling circuit at each station including a rectifier device connected in series relation with said channel, a balance type telemetering transmitter at one station, a metering receiver at the other station, relay means operable in response to selection of said points through the supervisory control equipment to connect the transmitter and receiver across the rectifier devices at said stations, impedance means having a value approximating the impedance of the channel, and circuit means connecting said impedance means across the transmitter when said transmitter is not connected to the channel.

WILLARD A. DERR.

REFERENCES CITED

The following references are of record in the file of this patent:

UNITED STATES PATENTS

| Number | Name | Date |
|---|---|---|
| 1,726,131 | Wensley et al. | Aug. 27, 1929 |
| 2,314,692 | Derr | Mar. 23, 1943 |